United States Patent [19]

Borgström et al.

[11] 3,859,467

[45] Jan. 7, 1975

[54] METHOD OF OPERATING FILE GATES IN A GATE MATRIX

[75] Inventors: Gert Ove Borgström, Hagersten; Walter Ghisler, Upplands Vasby, both of Sweden

[73] Assignee: Telefonaktiebolaget L M Ericsson, Stockholm, Sweden

[22] Filed: Apr. 30, 1973

[21] Appl. No.: 355,418

[30] Foreign Application Priority Data

May 18, 1972 Sweden .............................. 6514/72

[52] U.S. Cl. ..... 179/15 BY, 179/15 AQ, 340/166 R, 179/18 GE

[51] Int. Cl. .............................................. H04j 3/12

[58] Field of Search ........ 179/15 AQ, 15 A, 15 BA, 179/15 AT, 18 GF, 18 GE, 15 BY; 340/166 C, 166 R

[56] References Cited

UNITED STATES PATENTS

| | | | |
|---|---|---|---|
| 2,997,545 | 8/1961 | Hartley | 179/15 AL |
| 3,176,144 | 3/1965 | Gunderson | 340/166 C |
| 3,511,937 | 5/1970 | Bastian | 179/18 GE |
| 3,551,888 | 12/1970 | Balugani | 340/166 R |
| 3,573,381 | 4/1971 | Marcus | 179/15 AQ |
| 3,644,679 | 2/1972 | Tallegas | 179/15 AQ |
| 3,657,486 | 4/1972 | Gara | 179/18 GF |
| 3,678,205 | 7/1972 | Cohen | 179/15 AQ |
| 3,715,505 | 2/1973 | Gordon | 179/15 AQ |

*Primary Examiner*—Ralph D. Blakeslee
*Attorney, Agent, or Firm*—Hane, Baxley & Spiecens

[57] ABSTRACT

In a PCM exchange a compact construction of the crossing points in a gate matrix for space interchanges is achieved by dividing each time slot of the PCM time division multiplex system into an address phase followed by a PCM phase and by transmitting in each address phase two addresses to each crossing point. Each crossing point includes a file gate and is defined by one of files forming a file side on which the PCM words during the PCM phases are incoming to the matrix and by one of files forming a file side on which the PCM words are outgoing from the matrix. One of the two addresses is transmitted on the one file associated with the crossing point and associated with the one file side to indicate one of the files belonging to the other file side. The other of the two addresses is transmitted on said other file associated with the crossing point to indicate the other file. During each address phase, an address comparison is carried out in each crossing point and if both addresses are identical an activation signal is supplied during the associated PCM phase to the file gate associated with the crossing point. The activated file gate connects the files defining the crossing point. No extra control lines and connection pins are needed for operating the file gates and therefore the above-mentioned compact construction of the gate matrix is achieved.

8 Claims, 5 Drawing Figures

METHOD OF OPERATING FILE GATES IN A GATE MATRIX

The present invention relates to a method in a time division multiplex system of operating file gates in a gate matrix through which each PCM words is transmitted in series form from a file side with files (= high ways) coming in to the matrix to a file side with files going out from the matrix wherein in every time slot each incoming file is connected to an outgoing file by means of one of the file gates.

When applying a crossbar selector principle in the transmission of PCM words gate matrixes are used instead of relay controlled selectors in a conventional analog speech transmission. In the time division multiplex transmission of PCM words on a transmission file the speech channels occur cyclicly in the time slots of the time division multiplex system. Therefore the relatively slowly operating relays must be replaced by fast file gates which are suitable for binary signals and which make a very compact construction of the matrixes possible when applying IC (integrated circuit) techniques. The more compact the matrixes in such an exchange are built the easier the synchronizing problems effecting the transfer capacity of the exchange are mastered.

It is for example known through the Swedish patent 314,411 and through "The Post Office Electrical Engineers Journal," 1968, vol 61, page 186–195 (especially FIG. 7) to divide a time division multiplex selector network into a number of selector stages each comprising a number of gate matrixes to achieve the least total number of file gates which are controlled from a common contact memory by a common large and complicated control unit. Each file gate is hereby provided with at least one activation inlet which is connected to the control unit to be activated in a certain time slot.

In, for example, the Swedish patent 351,542 a decentralized time division multiplex selector network is described, in which the PCM words are transmitted in a parallel form and in which the need of file gates is further reduced. In order to improve the synchronizing conditions the contact memory is divided into a number of address memories and the addresses of the file gates are transmitted in a parallel form on the same time division multiplex file as that on which the associated PCM words are transmitted to the gate matrix. In the gate matrix each incoming file is connected to an address register. The address stored in the register is decoded in order to open the file gates on which the PCM words are transmitted in a parallel form.

By limiting the number of the file gates as a whole and by decentralizing the exchange improved synchronizing conditions are achieved. However, the compactness of the above-mentioned known gate matrixes is limited because the activation inlets of the file gates must be connected to the common control unit and to an address decoder, respectively. A known matrix of this kind with $n^2$ crossing points at $n$ incoming and $n$ outgoing files requires space for at least $2n + n^2$ connection pins.

An object of the invention is to reduce the number of connection pins and thereby further reduce the synchronizing difficulties. Another object of the invention is to provide a compact constructable gate matrix, in which the file gates are not activated separately from the outside of the matrix.

The invention is characterized as appears from the appended claims and will be described by means of an accompanying drawing wherein:

Figure 1:
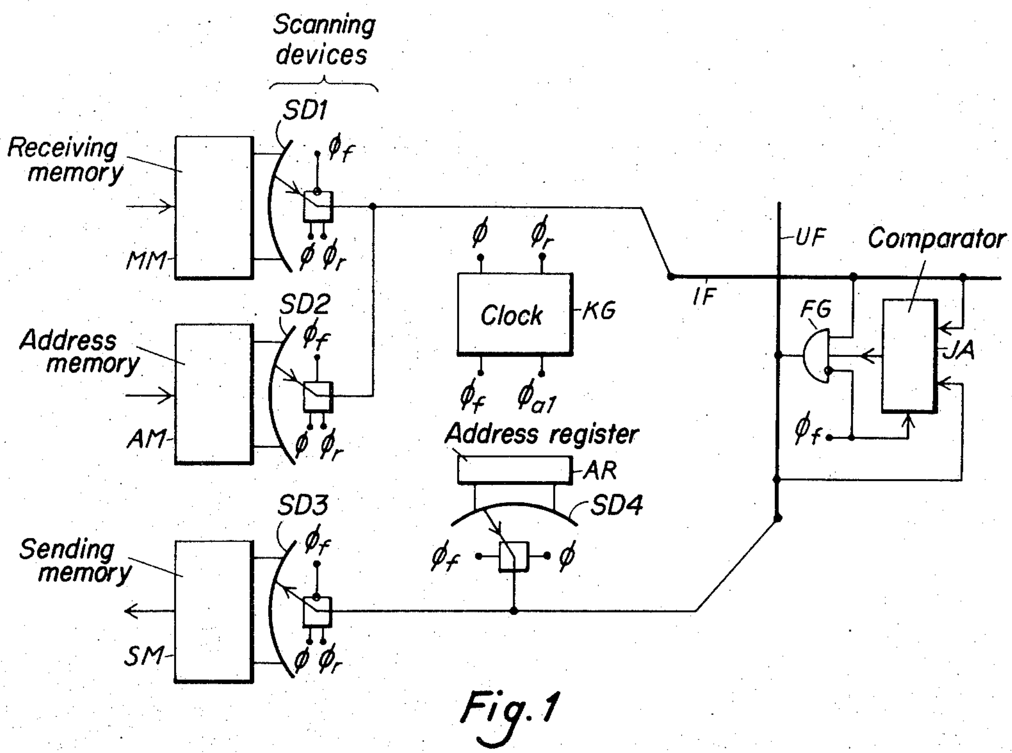
FIG. 1 is a block diagram of a preferred embodiment of the invention.

FIG. 1 is a simplified block diagram of the invention in that only one representative crossing point of the gate matrix between an incoming file IF and an outgoing file UF is shown. The actual gate matrix includes a plurality of such crossing points each connected between their associated incoming and outgoing files. The crossing point contains a file gate FG and a comparator or comparison device JA which are connected to the files crossing each other and to a clock generator KG. PCM words being transmitted in series form through the gate matrix are read from receiving memories and are written in sending memories. In the receiving memory MM shown in FIG. 1 PCM words are stored. Each of the words is transmitted of a time slot in a time division multiplex system on the file IF which in said time slot is connected to one of the outgoing files. In the sending memory SM shown in FIG. 1 PCM words are stored. Each of the words was transmitted in a time slot on the file UF which had been connected to one of the incoming files IF.

The PCM word memories such as memories MM and SM can be used by the exchange for other purposes. For example the PCM words can be regenerated by storing, the memories can also be used in connection with a change from one time division multiplex system to another, or in connection with a change from transmission in a parallel form to transmission in series form and vice versa. The writing in the receiving memories and the reading from the sending memories can be controlled by other clock generators whose phases are displaced in a usual way from the phase of said clock generator KG which controls the reading from the receiving memories and the writing in the sending memories, the phase displacement corresponding to about one/-half repetition period (=frame) which is the same in the applied time division multiplex systems. In this way the reading and writing in a memory never disturb each other and the arrangement shown in FIG. 1 is independent of the synchronizing conditions in the other stages of the transition exchange. This is indicated in FIG. 1 by the fact that only directional arrows symbolize the writing in the receiving memories and the reading from the sending memories.

Besides said word memories address memories and address registers are connected to the file sides of the gate matrix. In FIG. 1 an embodiment is shown in which an address memory AM is connected to the incoming file IF and an address register AR is connected to the outgoing file UF. In the address memory AM addresses are stored. Each of the addresses defines an outgoing file and consequently a communication path, which must be established, for example for a speech, between the incoming file IF and such outgoing file. In the address register AR the address defining the outgoing file UF is constantly registered. As will be described below, the clock generator KG controls the synchronous transmission in series form of the addresses stored in the address memory AM and the constant address registered in the address register AR, respectively, on the incoming file IF and on the outgoing file UF, respectively, and consequently to all comparison devices which are connected to file IF and file UF, respectively. Only the comparison device JA is connected to file IF as well as to file UF. When two identical addresses are received synchronously in a comparison device, a first activation inlet is activated in the file gate connecting the files which transmitted said identical addresses. From this it is apparent that equivalent to the embodiment shown in FIG. 1 there is an embodiment, in which the address memories are connected to the outgoing files and the address registers are connected to the incoming files, in each of the address registers the address of the connected file being registered and in the address memories the addresses of incoming files being stored to which respective outgoing file must be connected, for example for a speech. In both embodiments the writing in the address memories is carried out upon a switching order for connection or disconnection of a communication path. See the directional arrow to the address memory AM, in FIG. 1.

Figure 2:
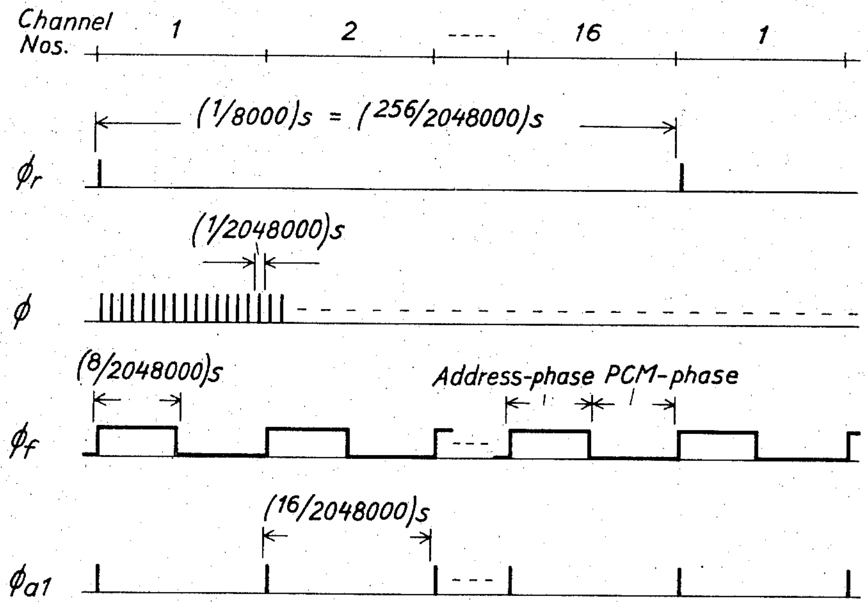
FIG. 2 is a time diagram with signals and pulses from a clock generator.

FIG. 2 shows in a timing diagram the signals which are generated on the outlets of the clock generator. The clock generator KG is stepped with a bit frequency $f_b$ in the multiplex system, which is used for the gate matrix, and transmits on an outlet $\phi$ timing pulses with said bit frequency. At a repetition frequency $f_r$, i.e., at a frame period $1/f_r$, during a frame period $f_b/f_r$ bit pulses are obtained and for $m$ serial pulses per PCM word $k_{max} = f_b/(f_r \cdot m)$ PCM words per frame are obtained, that is transmisssion channels per file, which channels are given separate time slots in the multiplex system. A phase signal on the outlet $\phi_f$ of the clock generator divides every time slot in an address phase followed by a PCM phase, which phases are defined in FIG. 2 for example by a signal amplitude which during the address phase represents an 1 and during the PCM phase a 0 in the used binary system. For $a$ series pulses per address in the address phase and for $m$ series pulses per PCM word in the PCM phase $k = fb/\ (f_r(m + a))$ transmission channels per file are obtained. In FIG. 2 it is assumed that $m = a = 8$, $k = 16$, $f_r = 8{,}000$ pps, that is the bit frequency $f_b = 16(8 + 8)8000 = 2{,}048{,}000$ pps and a frame period of 125 $\mu s$. A time slot contains 8+8 timing pulses and on the outlet $\phi_r$ of the clock generator a frame pulse is obtained at every 256th timing pulse.

FIG. 1 indicates that the scanning devices SD1 to SD3 of the address memories and word memories not only receive the phase signal from the outlet $\phi_f$ of clock KG for stopping the scanning of the word memories during the address phases and the scanning of the address memories during the PCM phases, but also receive and are controlled by the frame pulses and timing pulses from the outlets $\phi_r$ and $\phi$ of clock KG. Thus the memories are read and written, respectively, in a known way in series form with a repetition frequency which is determined by the frame pulses and with a bit rate which is determined by the timing pulses. The reading devices of the address registers are connected to the outlets $\phi_f$ and $\phi$, so that the reading is repeated for every address phase and is also carried out in series form. FIG. 1 indicates furthermore that the outlet $\phi_f$ is connected to an inverting second activation inlet of the file gate FG and to a control inlet of the comparison device JA, the outlet of which is connected to the above-mentioned first activation inlet of the file gate FG. In this way file gate FG is activated during a PCM phase, if during the address phase of a time slot identical addresses were transmitted to the comparison device JA. Even if only one crossing point is shown in FIG. 1, it is, however, apparent that a gate matrix containing such crossing points only requires space for connection pins for the incoming and the outgoing files and space for a common pin for the phase signal line from the outlet $\phi_f$ of the clock generator.

If a known gate matrix with a = 0 and with $n$ incoming and outgoing files, respectively, and $n^2$ crossing points is replaced, using the same bit frequency and transfer capacity, by a new matrix, in which the PCM words are transmitted according to the invention, the new matrix must indeed be provided with $2n$ incoming and outgoing files, respectively, and $4 \cdot n^2$ crossing points, if it is assumed as in FIG. 2 that the address phases and PCM phases have the same length. In spite of this the known matrix requires for its $2n + n^2$ connection pins more space than the new matrix with $4n + 1$ pins.

It is possible even in parallel transmission of the PCM words to apply the principle of the invention, to control a file gate device consisting of a number of gates (one for each parallel bit) by comparison devices arranged in the respective crossing point by means of integrated circuit techniques, for comparing the addresses transmitted on the crossing files. However, if the addresses like the PCM words are transmitted in a parallel form, in each comparison device only one pulse pair per address is compared and all comparison devices intermixed for one address are included in a comparison organ which determines whether all bit pairs are identical or not. This results in matrix constructions with more complicated comparison organs according to the foregoing and with more connection pins per crossing point than is the case for serial transmission.

Figure 3:
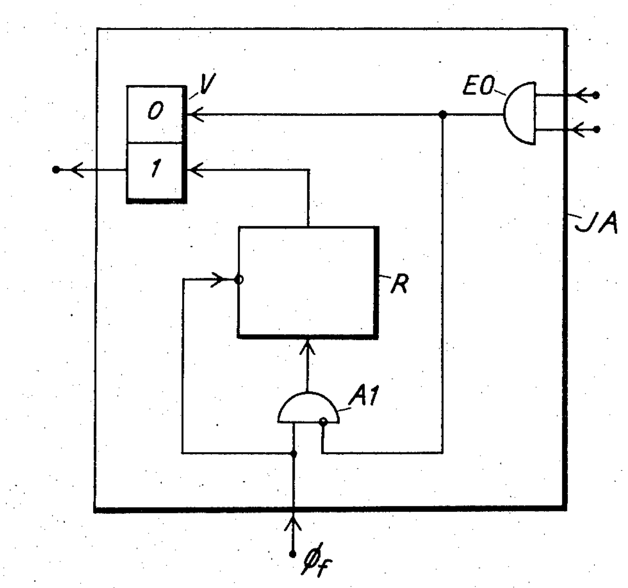
FIGS. 3–5 show embodiments for a comparison device which is included in each crossing point in a gate matrix according to the invention.
Figure 4:
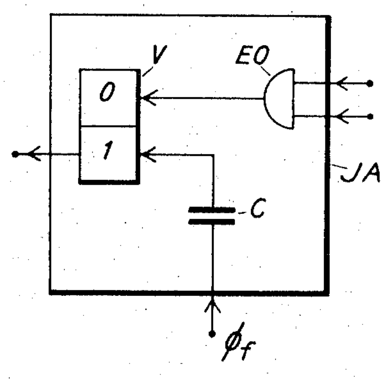
Figure 5:
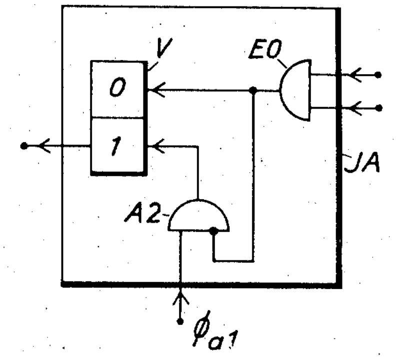

FIGS. 3–5 show different embodiments of the comparison devices JA which all have the crossing files connected to inlets of an EXCLUSIVE-OR-gate EO and contain a flip-flop circuit. The circuit V when activated at a first and a second inlet, respectively, is set to a first and a second stable condition or state, respectively. The first condition activates the outlet of the flip-flop circuit, which outlet is the outlet of the comparison device. The second inlet is connected to the outlet of said gate EO.

FIG. 3 shows a comparison device whose control inlet receives a phase signal from the outlet $\phi_f$ of the clock generator according to FIG. 2. The control inlet is connected to an inverting inlet the zero setting of a counter R and to a first inlet of an AND-gate A1 which has its inverting second inlet and its outlet, respectively, connected to the outlet of the gate EO and to the counter inlet of the counter, respectively. The counter being zero set during the PCM phase counts identical address series pulse pairs and activates its outlet during the last pulse period of an address phase, all pulse pairs of which having binary identical characters. Said outlet of the counter is connected to the first inlet of the flip-flop circuit V.

FIG. 4 shows a comparison device, the control inlet of which receives a phase signal from the outlet $\phi_f$ of the clock generator according to FIG. 2. The control inlet is connected to the first inlet of the flip-flop circuit V via a differentiating capacitor C, so that the change of the phase signal from the 0 to the 1 amplitude at the beginning of every address phase activates the outlet of the flip-flop circuit, which outlet is, however, disactivated if at least one of the pulse pairs of the address phase does not have identical characters. The embodiment according to FIG. 4 requires no counter, but to avoid the possibility that the two inlets of the flip-flop circuit are activated at the same time, the first pulse period of the address phase can not be used for the series pulses of the addresses.

FIG. 5 shows a comparison device provided with an AND-gate A2. The first inlet of the flip-flop circuit V is connected to the outlet of said gate A2, the inverting first inlet of which is connected to the outlet of the gate EO and the second inlet of which represents the control inlet of the comparison device, which control inlet is connected to an outlet $\phi_{al}$ of the clock generator KG of the matrix arrangement (see FIG. 1). On said outlet $\phi_{al}$ an activation pulse is generated in the first pulse period of the address phase, as it is shown at the very bottom of FIG. 2, so that the outlet of the flip-flop circuit is only activated if the first pulse pair of the addresses have identical binary characters and is deactivated again when at least one of the other pulse pairs does not have identical characters. The embodiment according to FIG. 5 requires no capacitor and no reduction of the pulse numbers of the addresses, but a gate matrix containing comparison devices according to FIG. 5 requires space for two common connection pins in order to control the file gates and the comparison devices by means of the outlets $\phi_f$ and $\phi_{al}$ of the clock generator.

We claim:

1. In a PCM exchange utilizing a time division multiplex system and having a file gate matrix through which each of the PCM words is transmitted serially during an associated time slot from a file side with files coming in to the matrix to a file side with files going out from the matrix, and wherein in every time slot each incoming file is connected to an outgoing file by means of one of the file gates arranged in the crossing points of the gate matrix, a method for operating the file gates comprising the steps of:

dividing each time slot into an address phase followed by a PCM phase, transmitting the PCM words to and from, respectively, the matrix in the PCM phases, transmitting in the address phases addresses, each of which defines one of the files on the files of the two file sides, to the matrix in such a way that each file on the one file side transmits an address defining a file on the other file side and that each file on the other file side transmits its own address, comparing in each address phase in each of the crossing points the address transmitted on the one file side with the address transmitted on the other file side, and activating, during each PCM phase, the file gates connected to such files crossing each other to which identical addresses were transmitted during the address phase associated with said PCM phase.

2. A PCM exchange comprising:

first and second sets of files arrayed in rows and columns, respectively, to form crossing points, one of said sets being incoming files, the other of said sets being outgoing files, and each of said files being assigned an address;

a clock generator for generating timing pulses wherein a number of such pulses form a time slot in a PCM time division multiplex system and for generating phasing pulses for dividing each of such time slots into an address phase and a PCM word phase;

a plurality of receiving word memories for receiving and storing words incoming to the exchange, each of said receiving word memories having an output connected to one of said incoming files and having means controlled by said clock generator for reading out onto its associated incoming file, in sequential PCM word phases, the stored PCM words;

a plurality of sending word memories for storing and transmitting words outgoing from the exchange, each of said word memories having an input connected to one of said outgoing files and having means controlled by said clock generator for accepting and recording from the associated outgoing file, in sequential PCM word phases, PCM words for storage;

a plurality of address memories for receiving and storing addresses associated with the files of said second set, each of said address memories having an output connected to one of the files of said first set and having means controlled by said clock generator means for reading out onto its associated file of said first set, in sequential address phases, the stored addresses;

a plurality of address registers, each of said address registers having an output connected to one of the files of said second set and storing the address of such file, and each of said address registers including means for reading onto its associated file of said second set the stored address during each address phase;

a plurality of file gates, each of said file gates being associated with a different one of the crossing points and having a word input connected to its associated incoming file, a word output connected to its associated outgoing file and a control input so that when a signal is received at said control input signals at said word input are transferred to said word output; and a plurality of address comparison means, each of said comparison means being associated with one of the crossing points and each having a first input connected to one file of said first set, a second input connected to one file of said second set and an output connected to the control input of the file gate associated with the files connected to its input, and each of said comparison means including means controlled by said clock generator for transmitting a signal on its output whenever the addresses received at its inputs have a predetermined relationship.

3. The PCM exchange of claim 2 wherein said receiving word memories and said address memories transfer the addresses onto the associated files in a serial format.

4. The PCM exchange of claim 3 wherein said address registers include means under control of said clock generator for transferring addresses onto the associated files in said serial format.

5. The PCM exchange of claim 4 wherein each of said comparison circuits comprises a two-input EXCLUSIVE-OR circuit having one input connected to its associated incoming file, the second input connected to its associated outgoing file and an output, and a flip-flop having a set-to-one input, a set-to-zero input connected to the output of said EXCLUSIVE-OR circuit and an output which is the output of the comparison circuit and which transmits a signal when the flip-flop is in the set-to-one state, and triggering means receiving timing pulses from said clock generator and connected to said set-to-one input for periodically triggering the flip-flop to the set-to-one state.

6. The PCM exchange of claim 5 wherein said clock generator includes a further output means for generating a pulse at the start of each address phase, and wherein said triggering means comprises two-input AND-circuit whose output is the output of said triggering means and having a direct input connected to the further output means of said clock generator and having an inhibiting input connected to the out-put of said EXCLUSIVE-OR CIRCUIT.

7. The PCM exchange of claim 5 wherein said triggering means comprises a pulse differentiating means which receives the phasing pulses from said clock generator.

8. The PCM exchange of claim 5 wherein said triggering means comprises: a pulse counter having an output connected to the set-to-one input of said flip-flop for emitting a pulse when a particular pulse count is accumulated, a clearing input for receiving the phasing pulses from said clock generator, and a pulse input; and a two-input AND-circuit having a direct input for receiving the phasing pulses from said clock generator, an inhibiting input connected to the output of said EXCLUSIVE-OR CIRCUIT, and an output connected to the pulse input of said pulse counter.

* * * * *